Patented Mar. 7, 1944

2,343,644

UNITED STATES PATENT OFFICE 2,343,644

PROCEDURE FOR THE PREPARATION OF SUBSTANCES CONTAINING CONJUGATED DOUBLE BONDS

John D. Cawley, Rochester, N. Y., assignor to Distillation Products, Inc., Rochester, N. Y., a corporation of Delaware No Drawing. Application July 30, 1941, Serial No. 404,658

9 Claims. (Cl. 260—405.6)

This application relates to an improved method for preparing substances containing conjugated double bonds and in particular to the preparation of fatty acid compounds containing conjugated double bonds.

It has heretofore been known to convert unconjugated polyene substances into conjugated polyene substances by heating with an excess of a basic substance in the presence of various solvents. See Burr Patent 2,242,230, May 20, 1941. In a publication by this author (see J. A. C. A. 61 (1939) page 3292) it was shown that ethylene glycol was the most satisfactory solvent for this process, giving a completed conversion in from one-half to two hours as compared to six to twenty-four hours for butanol.

This invention has for its object to provide an improved method for carrying out the foregoing procedure. Another object is to provide a method whereby the time required for the conversion of unconjugated substances into a conjugated system is materially reduced. A further object is to provide procedure whereby the conversion into a conjugated system is substantially more complete than has been heretofore possible with known conversion methods. A still further object is to provide improved solvents for carrying out the conjugation conversion. Other objects will appear hereinafter.

These and other objects are accomplished in accordance with my invention which includes treating the substance which is to be converted into a conjugated system and which contains two or more unconjugated double bonds (i. e., a polyene substance) with an excess of an alkaline substance while in the presence of a solvent comprising an ether of a polyhydric alcohol which contains a free hydroxyl group.

In the following description I have given several of the preferred embodiments of my invention. However, these are set forth for the purpose of illustration and not in limitation thereof.

Examples of improved solvents are alkoxy, aryl or aralkoxy-ethanols such as glycol monomethyl ether, glycol monobenzyl ether, and glycol monoethyl ether; (2-(alkoxy- aralkoxy-ethoxy) ethanols) such as diethylene glycol monoethyl ether, diethylene glycol monobutyl ether, and diethylene glycol monobenzyl ether; similar derivatives of other glycols, such as propylene glycol monomethyl ether, polyethylene glycols, such as dipropylene glycol ethyl ether; glyceryl monoalkyl or aryl or aralkyl ethers or glyceryl α, gamma, dialkyl or aryl or aralkyl ethers. Glycol monomethyl ether, glycol monobutyl ether, di-ethylene glycol and di-ethylene glycol monoethyl ether are already available commercially and are quite satisfactory solvents. Glycol monomethyl ether gives a higher conversion in a shorter time than any solvent of this group, and is much superior to any solvent which has heretofore been utilized in this reaction.

A convenient method of determining the degree of conjugation, and which may be used to test the course of the reaction, is to treat the material to be tested with a chloroform or similar solvent solution of a chloride of a polyvalent metal, as antimony trichloride. This material gives a reaction product with conjugated fatty acids having a blue or purple color. This enables a colorometric method of analysis of considerable accuracy. The reaction product is observed in an Evelyn photoelectric colorimeter with 520 mu filter. The preparation showing the highest extinction co-efficient can be assumed to contain 1000 "units of conjugation" per gram and the subsequent test material can be referred to this as a standard. The following units of conjugation per gram were found upon heating unconjugated acids with alkali and the following solvents, all other variables being held constant:

| Solvent | Units per gram | |
|---|---|---|
| Toluene | 39 | |
| Dioxane | 64 | |
| Butyl ether | 64 | soaps insoluble, polymerization during the reaction |
| Morpholine | 103 | |
| Water | 0 | |
| None | ca. 100 | |
| Glycol monomethyl ether | 1,000 | |
| Diethylene glycol | 515 | |
| Diethylene glycol monoethyl ether | 300 | |
| Ethylene glycol | 160 | |
| Diethylene glycol monobutyl ether | 340 | |

The extinction coefficient in ultra violet light is also a satisfactory method for determining the degree of conjugation produced. The conjugated products have a higher extinction coefficient than the unconjugated materials. The following values, obtained from the literature, can be used as a basis of comparison and as an indication of the degree of conjugation: 2 conjugated double bonds;

$$E_{1\,cm.}^{1\%} \ (230 \text{ mm.}) = 1200$$

3 conjugated double bnds E (270) = 2000; 4 conjugated double bonds E (302) = 2000 and 5 double bonds E (328) =1700. The following table illustrates the extinction coefficient $$E \frac{1\%}{1 \text{ cm.}}$$

at the wave lengths indicated of the conjugated reaction products produced by treatment with alkali in the presence of various solvents:

| Solvent | E (230) | E (270) | E (302) | E (328) | E (348) |
|---|---|---|---|---|---|
| Glycol monomethyl ether | 481 | 438 | 400 | 443 | 400 |
| Ethylene glycol | | 326 | 215 | 134 | 99 |
| Propylene glycol | 491 | 386 | 265 | 172 | 151 |

From the foregoing it is seen that the new solvents described herein result in a very complete and rapid conversion into conjugated systems compared with solvents heretofore known and used for this purpose. In each of the foregoing determinations the unsaturated material treated was the highly unsaturated acids of sardine oil.

It is preferable to use a strong alkali such as sodium, potassium, cesium, or lithium hydroxide or alcoholates thereof; also the alkali should be used in excess, i. e., in excess of the stoichiometric amount, such as that required to neutralize the free fatty acids or to saponify the free fatty acid derivatives such as esters thereof when esters or the like are treated. I prefer to use amounts of alkaline substance greatly in excess, such as amounts of alkali equalling one-half or the same as the weight of the fatty acids. When the amount of alkali is used which is one-half the weight of the fatty acids, it means that approximately three and one-half times the amount of alkali necessary to neutralize the free fatty acids (if they are the substance treated) is being used. However, it is to be understood that this constitutes my preferred proportions of alkali and that amounts greatly in excess or greatly less than those specifically mentioned can be utilized with satisfactory results.

The invention is preferably applied to free fatty acids or their esters and preferably to free fatty acids which have been purified so that substantially all contain at least two double bonds. However, the invention is applicable to the treatment of mixed or impure unconjugated polyene substances. For instance, the invention can be used to convert mixed fatty acids such as are obtained by saponification of an oil such as a fish oil (sardine, manhaden, cod liver, etc.) or a vegetable oil such as linseed or cottonseed oil. In such a case fatty acids containing two or more double bonds are converted into conjugated systems while saturated acids or those containing only one double bond are largely unaffected. It will be realized that this procedure with mixed acids is more expensive because the acids must be neutralized with alkali even though they are unaffected by the reaction. Vegetable or animal oils or waxes may be directly treated. Methyl esters of polyene fatty acids, ethers, fatty acid halides, nitriles, amides, alcohols and soaps may be similarly treated.

The amount of solvent can vary to a considerable degree. My experiments indicate that for optimum results four volumes of solvent to one of polyene substance should be used when the weights of polyene substance and alkali are equal and that two volumes of solvent to one of polyene substance should be used when the weight of alkali is half that of the polyene substance. With all conditions being the same, other than the amount of solvent, it will be found that lessening the amount of solvent brings about a quicker reaction. However, this cannot be carried too far because there is danger of the reaction proceeding with polymerization or other destructions. If the amount of alkali is increased, the amount of solvent should be increased for best results. For most purposes ½ to 10 volumes of solvent to 1 volume of polyene substance will be found to be satisfactory. However, larger or smaller proportions can be used and are to be understood as being within the scope of my invention.

The treatment is continued until the required degree of conjugation has been obtained. The degree of conjugation will increase with time and temperature. Heating at reflux temperature for a period of two hours results in substantially complete conjugation when methyl cellosolve is used. The reflux temperature will of course vary with each solvent. As a general rule temperatures of 60° to 200° are to be preferred, while temperatures of about 20° to 300° C. can be used.

After the reaction has proceeded to the desired stage the conjugated product is recovered. Conventional methods of recovery can be used; for instance, when fatty acid derivatives are treated the addition of mineral acid is all that is necessary. The soaps may, of course, be recovered as such and utilized where soaps containing conjugated double bonds are needed.

The conjugated products are useful for making resins, drying oils, inks and the like. Free fatty acids are useful for converting into resins, drying oils or the like, or they may be esterified with glycerine, etc., and used to form high quality paints or varnishes.

The following illustrates the effect of proportions of alkali and solvent:

*Example*

Three 5-gram portions of highly unsaturated sardine oil fatty acids were heated at reflux temperature, one sample containing an equal weight of potassium hydroxide and four volumes of glycol monomethyl ether, the second one-half the weight of alkali and two volumes of glycol monomethyl ether and the third one half the weight of alkali and four volumes of glycol monomethyl ether. The heating was continued for two hours. The following extinction coefficients were obtained:

| # | Grams KOH | E (230) | E (270) | E (300) | E (328) | E (348) |
|---|---|---|---|---|---|---|
| 1 | 5 | 481 | 438 | 400 | 440 | 400 |
| 2 | 2.5 | 535 | 612 | 336 | 185 | 198 |
| 3 | 2.5 | 600 | 742 | 305 | | |

To obtain a commercial rate of conversion it is essential that the reaction mixture be substantially anhydrous. Of course, water may be formed during the reaction so that the reaction mixture is not completely anhydrous. However, accumulation of water should preferably be avoided by conducting the reaction at a temperature at which water is distilled off and prevented from returning to the reaction mixture.

No special precautions need be taken to avoid oxidation during the reaction. As ordinarily carried out in a still little or no contact with air takes place. If desired the treatment can be carried out in the presence of an inert gas.

The condition of the polyhydric alcohol-ether solvent in the reaction mixture is not known. It is possible that reaction products between the alkali and the solvent such as alcoholates are formed, and I include such products within the meaning of the term "ether of a polyhydric alcohol."

The highly unsaturated sardine oil fatty acids mentioned herein were obtained by fractionating the fatty acids of sardine oil and consist essentially of the unsaturated $C_{20}$ and $C_{22}$ acids contained therein.

What I claim is:

1. The process of causing conjugation of the double bonds in a fatty polyene substance containing unconjugated double bonds, which process comprises treating the polyene substance with an excess of a basic substance while in the presence of an ether of a polyhydric alcohol which contains a free hydroxyl group, under substantially anhydrous conditions and continuing the treatment until conjugation of double bonds in the polyene substance takes place.

2. The process of causing conjugation of the double bonds in a fatty polyene substance containing unconjugated double bonds, which process comprises heating the polyene substance in the presence of an ether of a polyhydric alcohol which contains a free hydroxyl group, in the presence of an excess of strong alkali under substantially anhydrous conditions and continuing the heating until conjugation of double bonds in the polyene substance takes place.

3. The process of causing conjugation of the double bonds in a fatty acid compound which contains at least two unconjugated double bonds, which process comprises heating the fatty acid compound in the presence of an ether of a polyhydric alcohol, which contains a free hydroxyl group, in the presence of an excess of a strong alkali under substantially anhydrous conditions and continuing the heating until conjugation of double bonds in the polyene substance takes place.

4. The process of causing conjugation of the double bonds in a fatty acid which contains at least two unconjugated double bonds, which process comprises heating the fatty acid in the presence of an ether of a polyhydric alcohol which contains a free hydroxyl group, in the presence of an excess of strong alkali under substantially anhydrous conditions and continuing the heating until conjugation of double bonds in the polyene substance takes place.

5. The process of claim 4 in which the solvent used is equal to two to four times the volume of the fatty acid.

6. The process of causing conjugation of the double bonds in a fatty acid compound which contains at least two unconjugated double bonds, which process comprises heating the fatty acid compound in the presence of a member of the group consisting of glycol monomethyl ether, glycol monoethyl ether, glycol monobenzyl ether, glycol monobutyl ether, diethylene glycol, diethylene glycol monoethyl ether, diethylene glycol monobutyl ether, and diethylene glycol monobenzyl ether, in the presence of an excess of strong alkali under substantially anhydrous conditons and continuing the heating until conjugation of double bonds in the polyene substance takes place.

7. The process of claim 6 in which about two to four volumes of solvent to one of fatty acid compound and about ½ to one weight of alkali for each weight of fatty acid compound is used.

8. The process of causing conjugation of the double bonds in a fatty acid compound which contains at least two unconjugated double bonds, which comprises heating the fatty acid compound in the presence of glycol monomethyl ether, in the presence of a substantial excess of strong alkali under substantially anhydrous conditions and continuing the heating until conjugation of double bonds in the polyene substance takes place.

9. The process of causing conjugation of the double bonds in a soap of a fatty acid which contains at least two unconjugated double bonds which comprises heating the fatty acid soap in the presence of an ether of a polyhydric alcohol which contains a free hydroxyl group, in the presence of strong alkali under substantially anhydrous conditions and continuing the heating until conjugation of double bonds in the polyene substance takes place.

JOHN D. CAWLEY.